Oct. 13, 1970  G. R. COOK  3,533,877
METHOD OF APPLYING GLUE COMPONENTS
Original Filed June 19, 1967
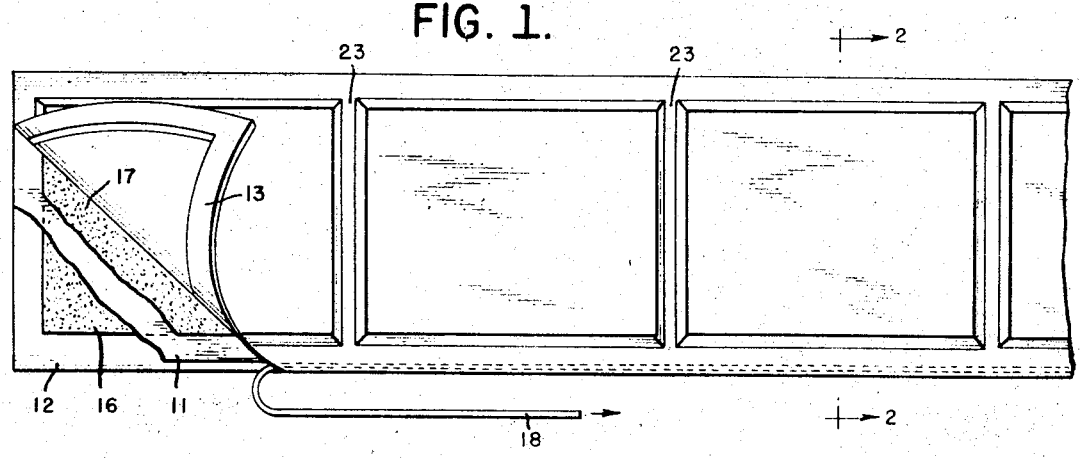
FIG. 1.
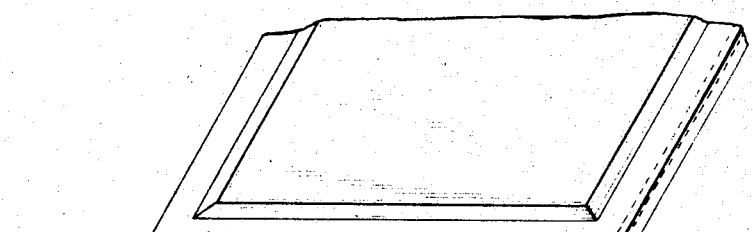
FIG. 2.
FIG. 3.
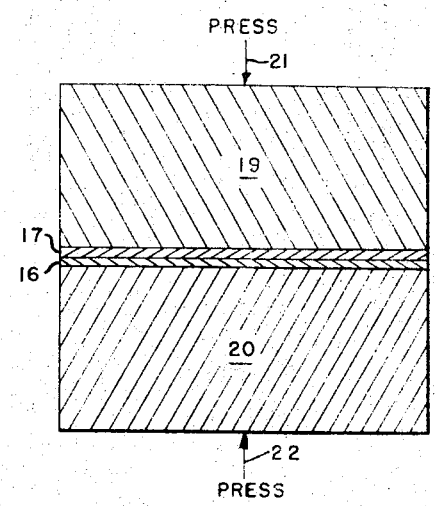
FIG. 4.
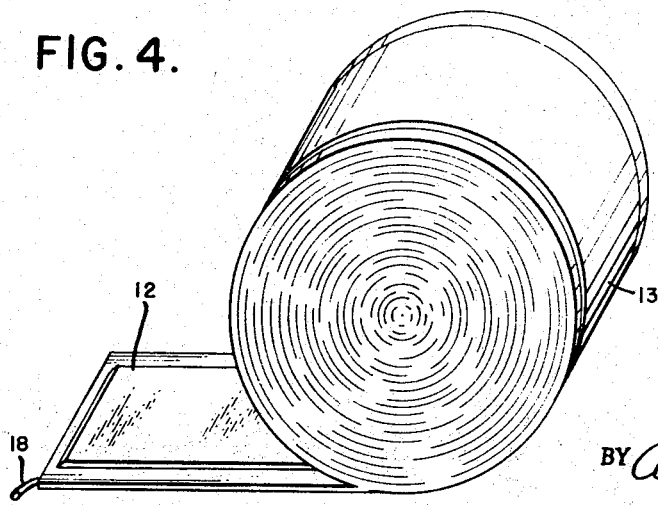
INVENTOR
GEORGE R. COOK
BY Albert J. Kramer
ATTORNEY

United States Patent Office 3,533,877
Patented Oct. 13, 1970

3,533,877
METHOD OF APPLYING GLUE COMPONENTS
George R. Cook, Rochester, N.Y., assignor to Cutler Mail Chute Company, Inc., Rochester, N.Y., a corporation of New York
Original application June 19, 1967, Ser. No. 646,833. Divided and this application Apr. 12, 1968, Ser. No. 720,975
Int. Cl. C09j 7/00
U.S. Cl. 156—313                                    4 Claims

ABSTRACT OF THE DISCLOSURE

A novel method for applying mutually reactive components of a glue, such as that of an epoxy resin, is provided. Porous sheets of material, like gauze, are impregnated with the components, respectively. The impregnated sheets of gauze are overlayed under pressure between members to be joined. The pressure is effective to blend the components in this state sufficient to cause the required typical chemical reaction which produces the final epoxy resin. Alternatively, the blending may be effected by the application of heat at about 200° C.

---

This is a division of my copending application for patent Ser. No. 646,833, filed June 19, 1967, now Pat. 3,396,836, dated Aug. 13, 1968.

This invention relates to gluing and it is more particularly concerned with a novel method for applying mutually reactive resin components of glue between parts to be glued together.

The general object of the invention is the provision of a relatively simple method by which reactive components of an epoxy resin, for example, can be quickly and effectively sandwiched between members to be joined.

A specific object is the provision of a method which makes it possible to indefinitely hold the two components in isolated relation relative to each other making it relatively simple to apply superimposed layers of the components between members to be joined.

Another object is the provision of such a method which obviates the necessity for mixing the components prior to application to the members to be joined.

A still further object is the provision of a method which uses multilayered tape containing the components in a sealed condition relative to each other and by means of which a desired section of tape may be severed and applied to members to be joined.

These and still further objects, advantages and features of the invention will be apparent from the following description considered together with the accompanying drawing.

In the drawing:

FIG. 1 is a top plan view of a device which may be used in conjunction with the invention.

FIG. 2 is a perspective view of a portion of the same device cut off along the line 2—2 of FIG. 1.

FIG. 3 is a diagrammatic sectional view illustrating the manner of using the invention between two members to be joined.

FIG. 4 is a perspective view of a roll of multilayered tape comprising another device for use in conjunction with the invention.

Referring to the drawing with more particularity the device illustrated in FIGS. 1 and 2 comprises a center section 11 and two outside sections 12 and 13, respectively, each of an imperforate material, such as sheet rubber, rubber coated fabric, plastic sheet material, cellophane, etc. The outer marginal edges of these sections are mutually secured together forming a pocket 14 between the sections 11 and 12 and another pocket 15 between the sections 11 and 13.

Each pocket 14 and 15 contains a sheet of porous material 16 and 17, respectively, such as a gauze, tissue paper, cheesecloth, fiberglass, polyurethane foam sheets, or other such open mesh material. Each sheet of porous material is impregnated with one of the two conventional mutually reactive components of an epoxy resin. Such epoxy resin components are well known in the art, are available commercially from numerous sources as a common household product and, therefore, need not be further described herein.

To facilitate opening the pockets, a tear string 18 is provided in the conventional manner as in other products, such as in packages of chewing gum, cigarettes, etc.

By virtue of the pockets 14 and 15 and their impervious walls the resin components are retained indefinitely without change until it is desired to use them. A section is cut off corresponding in size to the area of the joint to be formed such as a joint between two members 19 and 20.

By means of the tear string 18 the pockets are opened exposing the impregnated materials 16 and 17 which are removed from the pockets and placed in a superimposed position in the joint such as between the members 19 and 20. Pressure is then applied to the joint as indicated by the force arrows 21 and 22. This pressure has the effect of causing the compounds to intermingle in this state and blend to a degree sufficient to cause the required typical chemical reaction which produces the final epoxy resin.

Alternatively, heat may be applied to the layers of impregnated materials 16 and 17 on the order of about 200° C. This produces a blending by increased molecular action of the two components to an extent sufficient to develop the desired reaction.

The strip may be provided in a continuous form as shown in FIG. 3 wherein the pockets 14 and 15 are continuous from one end to the other; or it may be provided in the form shown in FIGS. 1 and 2 whereby individual pairs of pockets are provided extending in a series lengthwise of the strips, each pair of pockets being separated from its adjacent pair by a transverse closure 23 similar to that provided along the outer marginal edges.

What is claimed is:

1. The method of applying separately nonreactive, but mutually reactive resin glue components to a joint to be glued comprising saturating porous sheet materials, respectively, with each of the resin glue components exclusively, overlying the saturated sheet materials in the joint to be formed, applying compressive pressure to the sheet materials and maintaining the compressive pressure until reaction between the glue components is substantially complete.

2. The method as defined by claim 1 and applying heat to the sheets to cause molecular intermingling of the components.

3. The method as defined by claim 1 in which the glue components are of epoxy resin.

4. The method as defined by claim 2 in which the heat is applied at a temperature of about 200° C.

References Cited

UNITED STATES PATENTS

| | | | |
|---|---|---|---|
| 1,299,747 | 4/1919 | McClain | 156—313 |
| 2,557,826 | 6/1951 | Keaton et al. | 156—310 |
| 2,650,185 | 8/1953 | Larson et al. | 156—310 |
| 2,981,652 | 4/1961 | Peterson et al. | 156—310 |
| 3,231,443 | 1/1966 | McNulty | 156—310 |
| 3,337,382 | 8/1967 | Farago | 156—310 |
| 3,385,744 | 5/1968 | Van Sciver | 156—310 |
| 3,437,542 | 4/1969 | Mills | 156—310 |

REUBEN EPSTEIN, Primary Examiner